(12) United States Patent
Fujioka et al.

(10) Patent No.: US 7,867,087 B2
(45) Date of Patent: Jan. 11, 2011

(54) GAME PROGRAM, GAME DEVICE, AND GAME METHOD

(75) Inventors: Kenji Fujioka, Tokyo (JP); Naoki Nishikawa, Tokyo (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 469 days.

(21) Appl. No.: 11/685,782

(22) Filed: Mar. 14, 2007

(65) Prior Publication Data

US 2007/0155455 A1 Jul. 5, 2007

Related U.S. Application Data

(63) Continuation of application No. PCT/JP2005/016621, filed on Sep. 9, 2005.

(30) Foreign Application Priority Data

Sep. 21, 2004 (JP) ............................. 2004-273572

(51) Int. Cl.
*A63F 9/24* (2006.01)
(52) U.S. Cl. ............................. 463/37; 463/4
(58) Field of Classification Search ........................ None
See application file for complete search history.

(56) References Cited

U.S. PATENT DOCUMENTS

| | | | | |
|---|---|---|---|---|
| 4,672,541 A | * | 6/1987 | Bromley et al. ................. | 463/3 |
| 5,435,554 A | * | 7/1995 | Lipson ............................ | 463/3 |
| 6,196,917 B1 | * | 3/2001 | Mathias et al. .................. | 463/2 |
| 6,270,413 B1 | * | 8/2001 | Aikawa et al. ................. | 463/31 |
| 7,223,169 B2 | * | 5/2007 | Imaeda et al. ................... | 463/3 |

FOREIGN PATENT DOCUMENTS

| | | | |
|---|---|---|---|
| JP | 07-182092 A | 7/1995 |
| JP | 11-095650 A | 4/1999 |
| JP | 2002-000939 A | 1/2002 |
| JP | 3289072 B | 3/2002 |
| JP | 2005-193006 A | 7/2005 |
| JP | 2005-279165 A | 10/2005 |

OTHER PUBLICATIONS

Jagged Alliance Game Manual, by Sir-Tech Sofware, Inc.copyright 1995, 60 pages.*
"Jikkyo Powerful Pro-Yakyu Basic Ban 2001 Perfect Guide"; Konami Co., Ltd.; Jun. 2001; $1^{st}$ edition; pp. 8, 9 and 16-19.

* cited by examiner

*Primary Examiner*—M. Sager
(74) *Attorney, Agent, or Firm*—Global IP Counselors, LLP

(57) ABSTRACT

With a game implemented by the present game program, characters will be selected when a command means is placed into contact with a character. In addition, the movement direction of the command means will be identified when moved on the monitor. Then, the characters selected by the selection means will be moved in the movement direction of the command means. When this occurs, the movement state of the characters will be displayed on a monitor.

6 Claims, 6 Drawing Sheets

US 7,867,087 B2

GAME PROGRAM, GAME DEVICE, AND GAME METHOD

CROSS-REFERENCE TO RELATED APPLICATIONS

This application is a continuation application of International Application No. PCT/JP2005/016621 filed on Sep. 9, 2005. The entire disclosure of International Application No. PCT/JP2005/016621 hereby incorporated herein by reference.

This application claims priority to Japanese Patent Application No. 2004-273572. The entire disclosure of Japanese Patent Application No. 2004-273572 is hereby incorporated herein by reference.

BACKGROUND OF THE INVENTION

1. Field of the Invention

The present invention relates to a game program, and in particular to a game program for causing a computer to implement a game that displays a movable character on a touch panel type of monitor. In addition, the present invention relates to a game device and a game method that is implemented by this game program.

2. Background Art

Various video games have been proposed in the past. Various video games now allow one to issue various commands to a character displayed on a monitor by operating an input unit that is independent of a game unit, e.g., various input buttons on a controller, or by operating various input buttons that are integrally provided on the game unit. For example, a standard game device has a monitor, a game unit that is separate from the monitor, and a controller that is separate from the game unit. A plurality of input buttons are arranged on the controller. In addition, a portable game device has a game unit, a liquid crystal monitor arranged in the approximate central portion of the game unit, and a plurality of input buttons that are arranged on both sides of the liquid crystal monitor. With this type of game device, various commands can be issued to a character displayed on the monitor by operating at least one of the plurality of input buttons.

Thus, one known video game in which commands to a character are performed from input buttons includes a competitive video game, e.g., a baseball game, in which athlete characters are displayed on a monitor and a competition takes place. With this baseball game, if a player causes a defense character to move toward the ball in order to cause the defense character to catch the ball, the player can cause the desired character, e.g., a fielder character, to move toward the ball by selectively and continuously pushing up/down and left/right directional command buttons. Then, the fielder character can catch the ball when the fielder character arrives at the ball character.

With the conventional baseball game, if a player selectively and continuously pushes the up/down and left/right directional command buttons so as to cause the ball to be caught by a fielder character, the fielder character will move in the direction of the directional command buttons that were pushed. For example, if the player causes the fielder character to move right, the right directional command button will be consecutively or continuously pushed. In addition, if for example the player causes the fielder character to move diagonally upward and to the right, the right directional command button and the up directional command button will be selectively and consecutively pushed.

It will be easy for the player to cause a fielder character to move right because the player can simply continue to push the right directional command button when the player is to cause the fielder character to move right. However, it will be difficult for the player to accurately cause a fielder character to move diagonally upward and to the right because the player must selectively and continuously push the right directional command button and the up directional command button when the player attempts to cause the fielder character to move diagonally upward and to the right. The more the player attempts to accurately move the fielder character to a desired position, the greater number of times the player may have to push the right direction command button and the upward directional command button.

In view of the above, it will be apparent to those skilled in the art from this disclosure that there exists a need to make it possible to easily execute commands for moving a character. This invention addresses this need in the art as well as other needs, which will become apparent to those skilled in the art from this disclosure.

SUMMARY OF THE INVENTION

A game program according to a first aspect of the present invention is a program for implementing the following functions on a computer capable of implementing a game in which a movable character is displayed on a touch panel type of monitor.

(1) A selection function that will select a character when a command means is placed into contact with the character.

(2) A movement direction identification function that will identify the movement direction of the command means when moved on the monitor.

(3) A movement execution function that will move the character selected by the selection function in the movement direction of the command means.

(4) A movement state display function that will display the movement state of the character on the monitor.

With a game implemented by this program, a character will be selected with the selection function when the command means is placed into contact with the character. The movement direction identification function will identify the movement direction of the command means when moved on the monitor. The movement execution function will move the character selected by the selection function in the movement direction of the command means. The movement state display function will display the movement state of the character on the monitor.

With this game program, a character will be selected when the command means is placed into contact with the character. Then, the movement direction when the command means is moved on the monitor will be identified, and the selected character will be moved in the movement direction of the command means. At this point, the movement state of the character will be displayed on the monitor.

For example, consider a case in which a baseball game is implemented on a touch panel type of monitor, and a player causes a defense character to pitch the ball. In this case, with the aforementioned game program, the player can select the fielder character to move by placing the command means into contact with the fielder character. Then, if the player moves the command means on the monitor, the player can command the fielder character to move toward, for example, the ball. When this occurs, the player can move the selected character to move in the direction of the command means. The movement state of the fielder character at this point will be displayed on the monitor. Thus, the player can cause the fielder character to move in the direction of movement of the command means by simply moving the command means on the monitor. In this way, a player can easily execute a command to move a fielder character.

A game program according to a second aspect of the present invention is the game program of the first aspect, in which at least one of the movement direction of the character and the movement destination of the character will be further displayed on the monitor as a display element with the movement state display function.

Here, at least one of the movement direction of the character and the movement destination of the character will be displayed on the monitor as a display element. Because of this, in a baseball game for example, the direction in which a fielder character will move will be displayed on the monitor with, for example, an arrow or the like, if the player commands the fielder character to move in that direction. In addition, the movement destination of the fielder character will be displayed on the monitor with, for example, a circle mark or the like. In this way, a player can visually identify the movement direction and the movement destination of a fielder character.

A game program according to a third aspect of the present invention is the game program of the first or second aspects, and is a program for further implementing the following function in a computer.

(5) A movement speed identification function that will identify the movement speed of the command means when moved on the monitor.

With a game implemented by this program, the movement speed of the command means when moved on the monitor will be identified with the movement speed identification function. Then, a character will be moved in the movement direction of the command means with the movement execution function in response to the movement speed.

Here, the movement speed when the command means is moved on the monitor will be identified, and the character will be moved in the movement direction of the command means in response to the movement speed. Because of this, with a baseball game for example, a fielder character can be caused to move quickly in the movement direction of the command means if a player moves the command means quickly on the monitor, and a fielder character can be caused to move slowly in the movement direction of the command means if a player moves the command means slowly on the monitor. In this way, a player must do his or her utmost to quickly determine the fielder character that he or she wants to move and then move the command means in the desired direction, and can thus experience the feeling of speed when causing the fielder character to move.

A game program according to a fourth aspect of the present invention is the game program of any of the first to third aspects, and is a program for implementing the following function in a computer.

(6) A trajectory identification function that will identify the trajectory of the command means when moved on the monitor.

With a game implemented by this program, the trajectory of the command means when moved on the monitor will be identified with the trajectory identification function. Then, a character will be moved in the movement direction of the command means with the movement execution function so that the character moves along the trajectory.

Here, the trajectory when the command means is moved on the monitor will be identified, and the character will be moved in the movement direction of the command means so that the character moves along the trajectory. Because of this, in a baseball game for example, a player can move a fielder character in the movement direction of the command means along the trajectory in which the command means was moved by the player. In this way, the player can move the fielder character on a desired route to a movement destination.

A game program according to a fifth aspect of the present invention is the game program of the fourth aspect, in which the trajectory of the character will further displayed on the monitor with the movement state display function.

Here, because the trajectory of the character is displayed on the monitor, in a baseball game for example, the trajectory ordered by a player, i.e., the route, can be visually identified.

A game program according to a sixth aspect of the present invention is the game program according to any one of the first to fifth aspects, in which a plurality of characters can be selected with the selection function by placing the command means into contact with a plurality of characters.

Here, a plurality of characters can be selected by placing the command means into contact with a plurality of characters. Because of this, in a baseball game for example, a player can easily command the movement of a plurality of characters with the command means.

A game device according to a seventh aspect is a game device that can implement a game in which a moveable character is displayed on a touch panel type of monitor. This game device comprises selection means, movement direction identification means, movement execution means, and movement state display means. A character will be selected with the selection means when the command means is placed into contact with the character. The movement direction identification means will identify the movement direction of the command means when moved on the monitor. The movement execution means will move the character selected by the selection means in the movement direction of the command means. The movement state display means will display the movement state of the character on the monitor.

A game method according to an eighth aspect is a game method that can implement a game in which a moveable character is displayed on a touch panel type of monitor. This game method comprises a selection step, a movement direction identification step, a movement execution step, and a movement state display step. A character will be selected with the selection step when the command means is placed into contact with the character. The movement direction identification step will identify the movement direction of the command means when moved on the monitor. The movement execution step will move the character selected by the selection means in the movement direction of the command means. The movement state display step will display the movement state of the character on the monitor.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Construction of the Game Device

Figure 1:
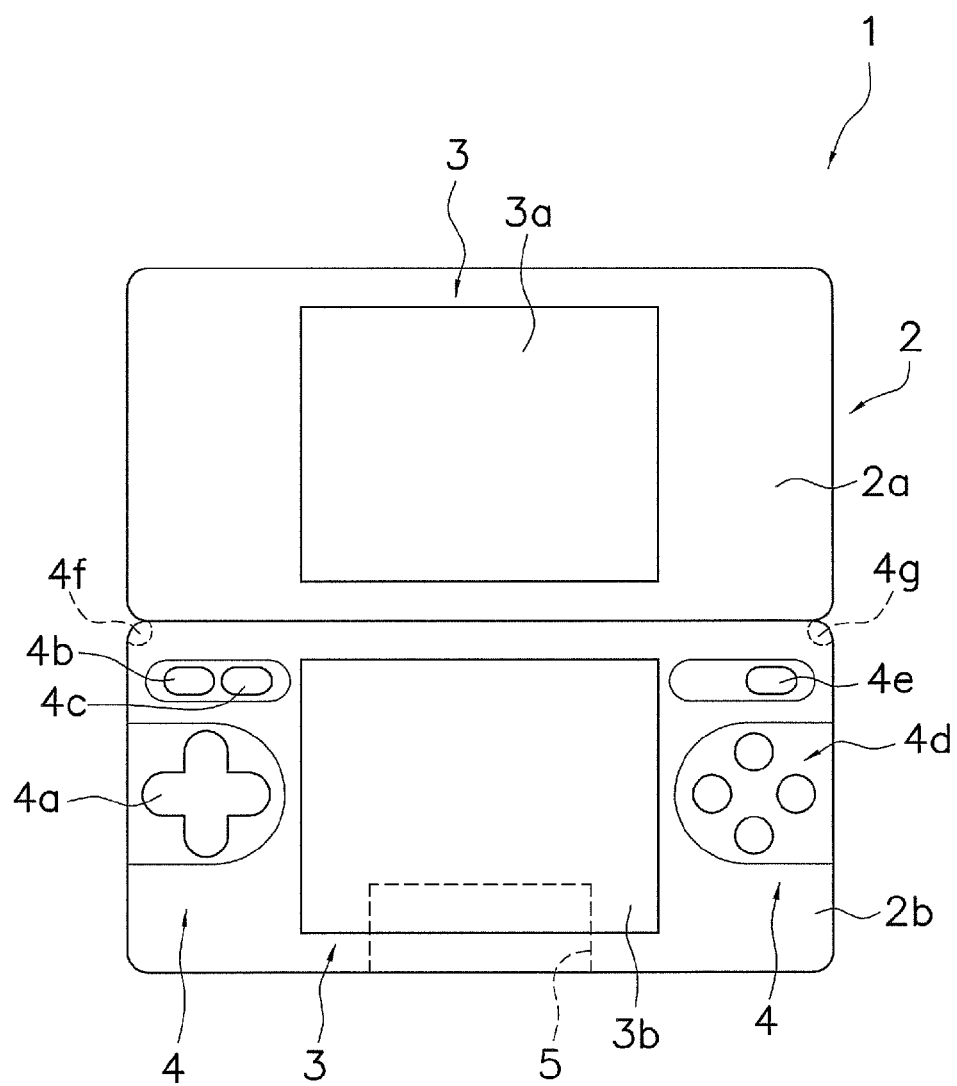
FIG. 1 is a external view of a portable game unit (an example of a computer) that can use a game program according to the present invention.

FIG. 1 is an external view of a portable game unit (an example of a computer) that can use a game program according to the present invention. In addition, FIG. 2 is one example of a control block diagram of the portable game unit.

As shown in FIG. 1, the portable game unit 1 primarily has a main case 2, a liquid crystal monitor unit 3, an input unit 4, a cartridge mounting unit 5, and a communication unit (not shown in the drawings). The main case 2 has an upper case 2a and a lower case 2b. The upper case 2a and the lower case 2b are connected to each other such that they can be opened and closed. The liquid crystal monitor unit 3 comprises an upper liquid crystal monitor 3a provided in the upper case 2a, and a lower liquid crystal monitor 3b provided in the lower case 2b. Here, for example, the upper liquid crystal monitor 3a is a non-touch panel type monitor, and the lower liquid crystal monitor 3b is a touch panel type monitor. The non-touch panel type monitor is comprised of a liquid crystal panel, and the touch panel type monitor is comprised of a liquid crystal panel and a touch panel. On the touch panel type monitor, the display surface of the liquid crystal panel and the data input surface of the touch panel are laminated together so as to be integral with each other. The input unit 4 comprises a cross-shaped directional command button 4a that is arranged on the central portion of the left side of the lower case 2b, a select button 4b and a start button 4c arranged from left to right on the upper portion of the left side of the lower case 2b, command buttons 4d that are arranged in the central portion of the right side of the lower case 2b, a power button 4e that is arranged on the upper portion of the right side of the lower case 2b, and an L button 4f and a R button 4g arranged on the left and right corners of the lower case 2b. The cartridge mounting unit 5 is provided in the lower portion of the lower case 2b. A game cartridge or the like can be mounted in the cartridge mounting unit 5. The communication unit is built into the main case 2, e.g., the lower case 2a. A local wireless network function, internet connection via wireless LAN function, or the like are provided by the communication unit. Note that a sound volume adjustment button, an earphone jack, and the like are provided in the game unit 1, but an explanation of these will be omitted.

Figure 2:
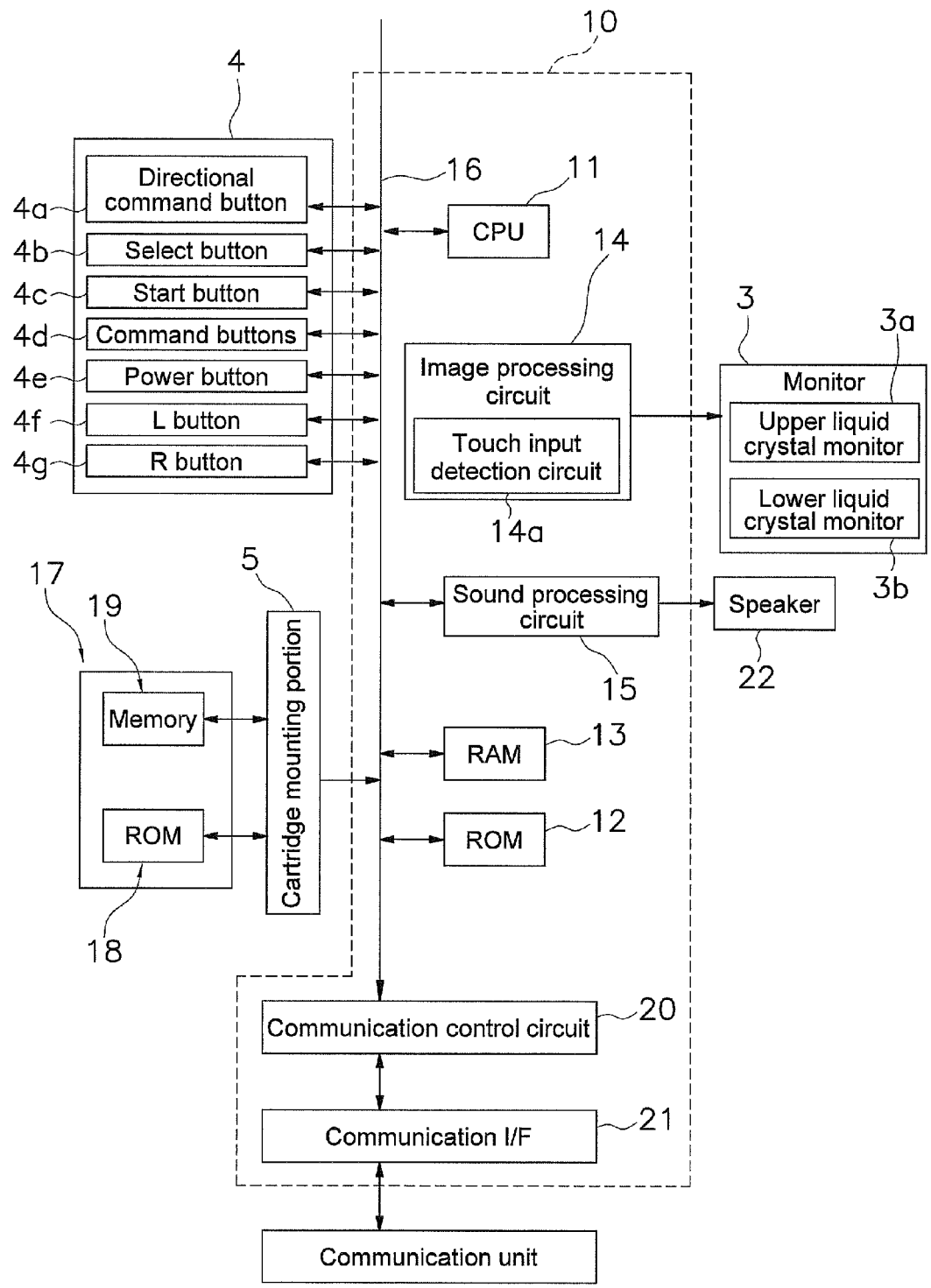
FIG. 2 is an example of a control block diagram of the portable game unit.

As shown in FIG. 2, the portable game unit 1 has a control device 10 in the interior thereof. A CPU (Central Processing Unit) 11 which uses a microprocessor, a ROM (Read Only Memory) 12 as a main storage device, a RAM (Random Access Memory) 13, an image processing circuit 14, a sound processing circuit 15, and a communication control circuit 20 of the control device 10 are connected to each other via a bus 16.

The CPU 11 will interpret instructions from a game program, and will perform various types of data processing and control. The ROM 12 will store programs and the like needed for basic control of the game unit 1 (e.g., start-up control). The RAM 13 will maintain a working area for the CPU 11. The image processing circuit 14 controls the liquid crystal monitor unit 3 in response to rendering commands from the CPU 11, and displays predetermined images on at least one of the upper liquid crystal monitor 3a and the lower liquid crystal monitor 3b. In addition, a touch input detection circuit 14a is included in the image processing circuit 14. When a command means, e.g., a touch pen, a finger, or the like is brought into direct contact with the touch panel, coordinate date of the contact position will be supplied from the touch input detection circuit 14a to the CPU 11, and the contact position will be identified by the CPU 11. In addition, when the command means is brought into direct contact with the touch panel at the position of a target object displayed on the liquid crystal panel, coordinate data of the target object will be supplied from the touch input detection circuit 14a to the CPU 11, and the target object will be identified by the CPU. The sound processing circuit 15 will produce analog audio signals in response to sound generation commands from the CPU 11, and will output the same to a speaker 22. The communication control circuit 20 is included in the communication unit, and is employed in order to wirelessly connect the game unit 1 to another game unit or the like. The communication control circuit 20 is connected to the CPU 11 via the bus 16. In response to instructions from the CPU 11, the communication control circuit 20 will control and dispatch connection signals for connecting the game unit 1 to the internet via a local wireless network or a wireless LAN.

An external storage device 17 that is separate from the control device 11 is connected to the bus 16. For example, the external storage device 17 is a game cartridge that is removably mounted in the main case 2, e.g., the lower case 2b. A ROM 18 as a storage medium, and a memory 19 as a rewriteable user memory, are provided in the interior of the external storage device 17. A game program that causes the game unit 1 to function as a computer, and various types of data needed in the execution of the game program, are stored in advance in the ROM 18. The various types of data include various types of character image data, e.g., various types of panel image data, attribute image data, and the like. Rewriteable memory such as flash memory is used in the memory 19. Saved game data or the like will be stored in the memory 19 in response to need. Note that the storage medium of the external storage device 17 is not limited to a semiconductor memory element, and various other types of storage media may be used, such as a magnetic storage medium, an optical storage medium, a magneto-optical storage medium, or the like. Note also that an interface circuit is interposed between the bus 16 and each element, but illustration of these will be omitted here.

With the game unit 1 constructed as described above, a player can play various game genres on the liquid crystal monitor unit 3 by loading a game program stored in the ROM 18 of the external storage device 17, and executing the loaded game program with the CPU 11. In addition, by connecting the game unit 1 with another game unit with a wireless network, or connecting the game unit 1 with another game unit via a communication cable or the like, data can be exchanged with another game unit or a competition type game can be played via the communication control circuit 10.

Summary of Various Types of Processes in the Game Device

Figure 3:
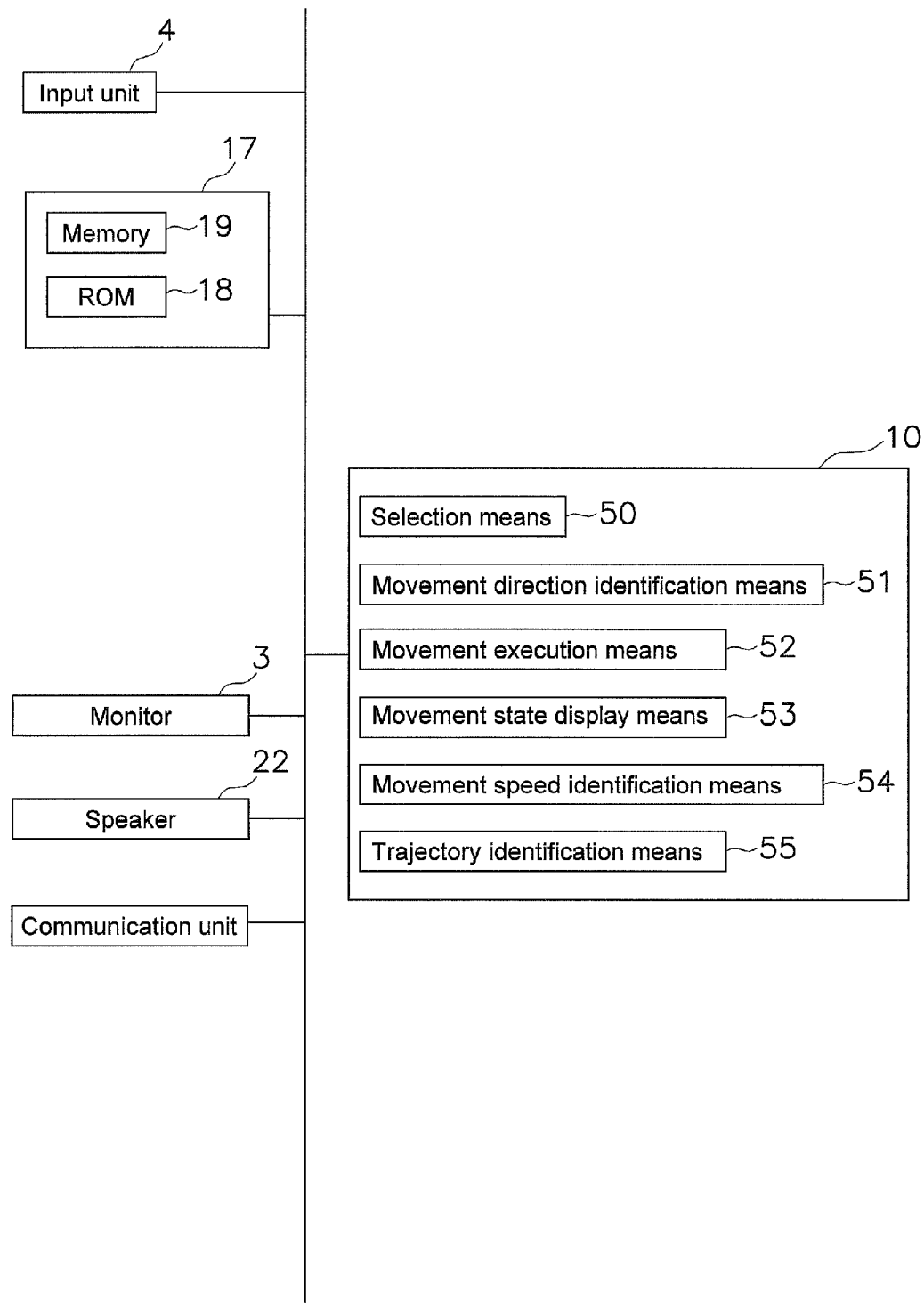
FIG. 3 is an example of a function block diagram of the portable game unit.

A game that can be executed in the present game unit 1 is, for example, a baseball game. FIG. 3 is a function block diagram for explaining the functions that play an essential role in the present invention.

A moveable character will be displayed on the touch panel type monitor of the game unit 1. The game unit 1 primarily comprises selection means 50, movement direction identification means 51, movement execution means 52, movement state display means 53, operation speed identification means 54, and trajectory identification means 55.

The selection means 50 is implemented by a function that will select a fielder character when the command means is placed into contact with the fielder character. With the selection means 50, if the command means, e.g., a touch pen, a finger, or the like, is brought into contact with the touch panel in the position of a fielder character displayed on the liquid crystal panel used as a touch panel, the coordinate data of the fielder character will be supplied from the touch input detection circuit 14a to the CPU 11. In this way, the position of the fielder character commanded with the command means will be identified by the CPU 11, and the fielder character will be in a state identified by the CPU 11. With the selection means 50 described above, a state in which a plurality of fielder characters have been selected, i.e., a state in which a plurality of characters have been identified by the CPU 11, can be obtained by consecutively placing the command means into contact with a plurality of fielder characters.

The movement direction identification means 51 is implemented by a function that will identify the movement direction when the command means is moved on the monitor. With the movement direction identification means 51, if the command means, i.e., a touch pen, finger, or the like, is moved while in contact with the position of a fielder character displayed on the liquid crystal monitor, the coordinate data of the contact position of the command means will be consecutively supplied from the touch input circuit 14a to the CPU 11 in response to the movement of the touch pen. Then, based upon the coordinate data of the contact position before and after movement, the movement direction of the command means will be computed by the CPU 11. Then, the movement direction of the command means will be identified by the CPU 11.

The movement speed identification means 54 is implemented by a function that will identify the movement speed of the command means when moved on the monitor. With the movement speed identification means 54, when the command means, e.g., a touch pen, a finger, or the like, is moved while in contact with the touch panel, the movement speed of the command means on the monitor will be calculated by the CPU 11 based upon the coordinate data of the contact position and time data during movement supplied by the CPU 11. Thus, the movement speed of the command means will be identified by the CPU 11 and stored in the RAM 13.

The trajectory identification means 55 is implemented by a function that will identify the trajectory of the command means when moved on the monitor. With the trajectory identification means 55, when the command means, e.g., a touch pen, a finger, or the like, is moved while in contact with the touch panel, the trajectory of the command means on the monitor will be calculated by the CPU 11 based upon the coordinate data of the contact position consecutively supplied by the CPU 11. Then, the trajectory of the command means will be identified by the CPU 11.

The movement execution means 52 is implemented by a function that will move a fielder character selected by the selection means 50 in the movement direction of the command means. With the movement execution means 52, command signals for moving a fielder character identified by the CPU 11 in the movement direction of the command means, e.g., a touch pen, a finger, or the like, will be issued from the CPU 11 to the image processing circuit 14.

In addition, the movement execution means 52 is implemented by a function that will move a fielder character in the movement direction of the command means in response to the movement speed. With the movement execution means 52, command signals for moving a fielder character identified by the CPU 11 in the movement direction of the command means, e.g., a touch pen, a finger, or the like, will be issued from the CPU 11 to the image processing circuit 14 in response to the movement speed calculated by the CPU 11 and stored in the RAM 13.

Furthermore, the movement execution means 52 is implemented by a function that will move a fielder character selected by the selection means 50 in the movement direction of the command means along the trajectory thereof. With the movement execution means 52, command signals for moving a fielder character identified by the CPU 11 in the movement direction of the command means, e.g., a touch pen, a finger, or the like, along the trajectory calculated by the CPU 11 will be issued from the CPU 11 to the image processing circuit 14.

The movement state display means 53 is implemented by a function that will display the movement state of a fielder character on the monitor. With the movement state display means 53, the movement state of the fielder character will be displayed on the monitor 3, e.g., the lower monitor 3b, by the image processing circuit 14 that received the command signals from the CPU 11. More particularly, the movement state of the fielder character will be displayed on the liquid crystal panel used as a touch panel on the lower monitor 3b.

In addition, the movement state display means 53 is implemented by a function that will display at least one of the movement direction of a character and the movement destination of a character as a display element. With the movement state display means 53, at least one of the movement direction of a character and the movement destination of a character will be displayed by the image processing circuit 14 on the monitor 3, e.g., the lower monitor 3b, as a display element stored in the ROM 18, based upon the coordinate data of the movement direction of the command means, e.g., a touch pen, a finger, or the like, and the contact position after movement. More particularly, at least one of the movement direction of a character and the movement destination of a character will be displayed with a display element on the liquid crystal panel used as a touch panel on the lower monitor 3b.

Furthermore, the movement state display means 53 is implemented by a function that will display the trajectory of the character on the monitor. With the movement state display means 53, the trajectory that indicates the movement state of the fielder character will be displayed on the monitor 3, e.g., the lower monitor 3b, by the image processing circuit 14, based upon the trajectory of the command means identified by the CPU 11. More particularly, the trajectory that indicates the moving state of the fielder character will be displayed on the touch panel liquid crystal panel used as a touch panel the lower monitor 3b.

Summary of the Baseball Game

Next, the specific content of the baseball game of the present embodiment will be explained.

This baseball game primarily comprises a batting system that issues commands with regard to batting to a batter character, a defense system that issues commands with regard to catching and throwing to a fielder character, a pitching system that issues commands with regard to pitching to a pitcher character, and a base running system that issues commands with regard to base running to a base running character. Each of these systems is realized by a game program stored in the ROM 18, for example, and is executed in the game unit 1.

A summary of the pitching system that plays an essential role in the present invention will be explained below.

The defense system makes defensive operations possible by commanding the movement of fielders with the command means, e.g., a touch pen, a finger, or the like.

Figure 4:
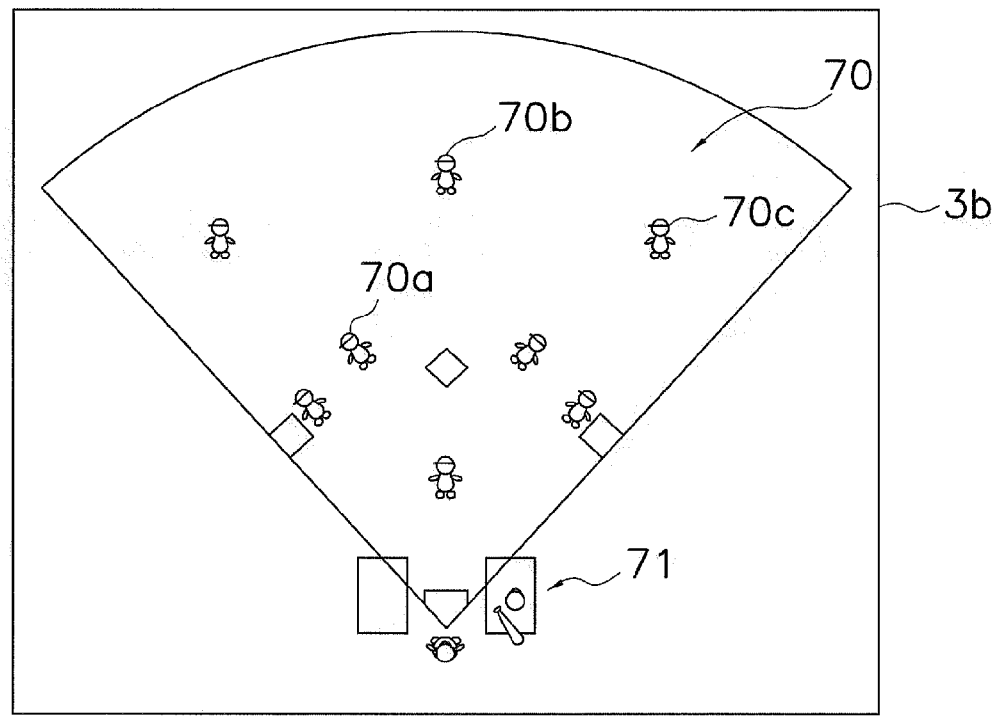
FIG. 4 is a basic explanation of the defense system in a baseball game.
Figure 5:
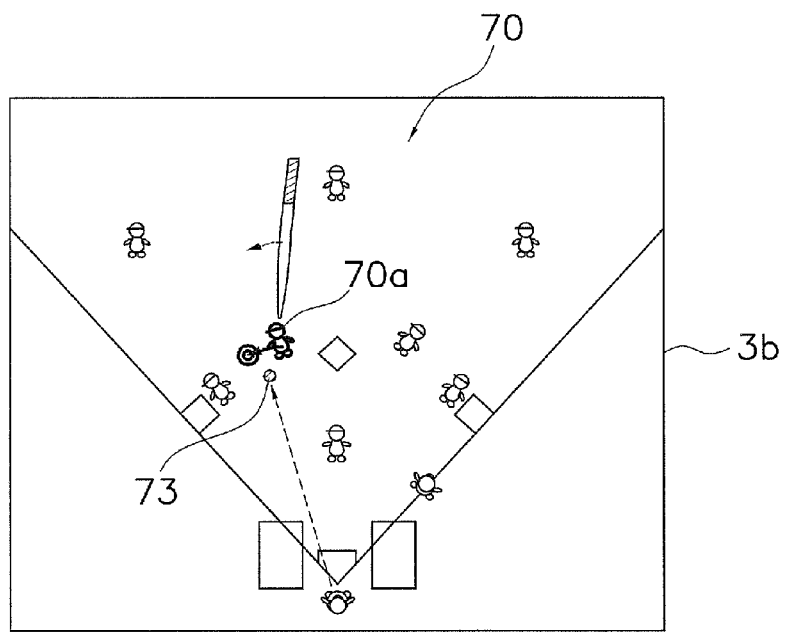
FIG. 5 is an explanation of the defense system in a baseball game (movement example 1).
Figure 6:
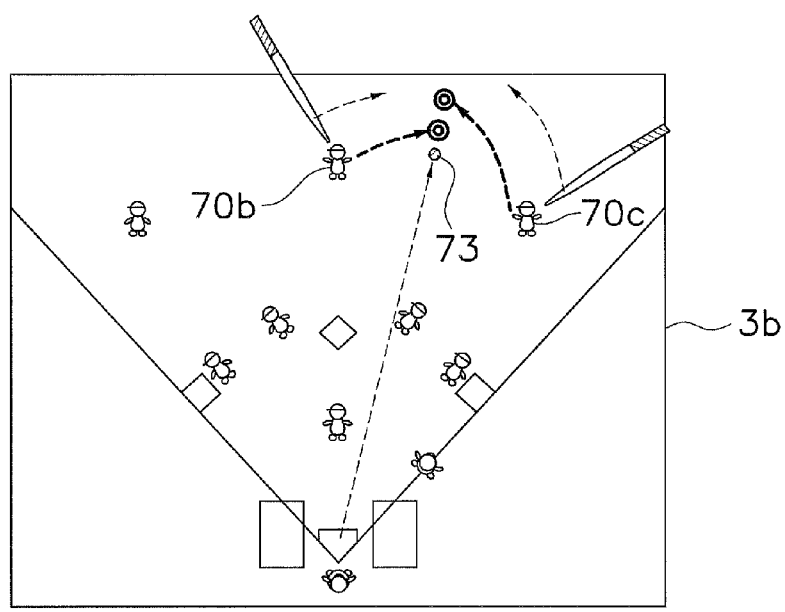
FIG. 6 is an explanation of the defense system in a baseball game (movement example 2).

With the present baseball game, as shown in FIGS. 4 to 6, when a player is to operate the defense characters, defense characters 70 and a batter character 71 will be primarily displayed on the lower touch panel type of monitor. For example, the defense characters 70 include a pitcher character, a catcher character, and a plurality of fielder characters.

For example, if a player causes the ball character 73 to be dispatched from the pitcher character, and the opposition player or an AI player causes the batter character 71 to move, the ball character 73 hit by the batter character 71 will fly to the infield or outfield. At this point, if the player places the touch pen into contact with any one of the defense characters 70, that character will be selected as the selected character. Then, if the player places the touch pen into contact with the selected character and moves it toward the predicted movement destination of the ball character 73, the selected character will move in the direction that the touch pen was moved along the trajectory of the touch pen in response to the speed at which the touch pen was moved. At this point, the trajectory of the selected character will be displayed on the monitor with a display element consisting of, for example, a broken line having an arrow. Then, the movement destination of the selected character will be displayed on the monitor with, for example, a display element consisting of a circle mark. Thus, the selected character will move toward the predicted movement destination of the ball character 73 in a state in which the broken line display element and the circle mark display element are displayed on the monitor. Then, the selected character will catch the ball when the selected character arrives at the ball character 73. Note that the selection and movement of the defense characters 70 can be respectively performed with respect to the pitcher character, the catcher character, and the plurality of fielder characters by means of the touch pen. Then, each display element will be displayed with respect to each selected character. Thus, if a plurality of characters have been selected by the touch pen, the character from amongst the plurality of characters that has arrived at the ball character 73 first will catch the ball.

For example, as shown in FIG. 5, if the ball character 73 hit by the batter character 71 flies to the area between the third baseman and shortstop, the fielder character 70*a* at shortstop will be selected if the player places the touch pen into contact with the fielder character 70*a* at shortstop. Then, if the player places the touch pen into contact with the fielder character 70*a* at shortstop and moves the touch pen toward the predicted movement destination of the ball character 73, the fielder character 70*a* at shortstop will move in the direction that the touch pen was moved along the trajectory of the touch pen, i.e., toward the predicted movement destination of the ball character 73, in response to the speed at which the touch pen was moved. At this point, the movement trajectory of the fielder character 70*a* at shortstop will be displayed with a broken line and arrow display element on the monitor, and the movement destination of the fielder character 70*a* at shortstop will be displayed with a circle mark on the monitor. Then, when the fielder character 70*a* at shortstop has arrived at the ball character 73, the fielder character 70*a* at shortstop will catch the ball.

For example, as shown in FIG. 6, if the ball character 73 hit by the batter character 71 flies to the area between right and center field, first, the fielder character 70*b* at center field will be selected if the player places the touch pen into contact with the fielder character 70*b* at center field. Then, if the player places the touch pen into contact with the fielder character 70*b* at center field and moves the touch pen toward the predicted movement destination of the ball character 73, the fielder character 70*b* at center field will move in the direction that the touch pen was moved along the trajectory of the touch pen, i.e., toward the predicted movement destination of the ball character 73, in response to the speed at which the touch pen was moved. At this point, the movement trajectory of the fielder character 70*b* at center field will be displayed with a broken line and arrow display element on the monitor, and the movement destination of the fielder character 70*b* at center field will be displayed with a circle mark on the monitor. Next, if the player places the touch pen into contact with the fielder character 70*c* at right field, the fielder character 70*c* at right field will be selected. Then, if the player places the touch pen into contact with the fielder character 70*c* at right field and moves the touch pen toward the predicted movement destination of the ball character 73, the fielder character 70*c* at right field will move in the direction that the touch pen was moved along the trajectory of the touch pen, i.e., toward the predicted movement destination of the ball character 73, in response to the speed at which the touch pen was moved. At this point, the movement trajectory of the fielder character 70*c* at right field will be displayed with a broken line and arrow display element on the monitor, and the movement destination of the fielder character 70*c* at right field will be displayed with a circle mark on the monitor. Then, when either one of the fielder character 70*b* at center field and the fielder character 70*c* at right field has arrived at the ball character 73, the fielder character 70*b*, 70*c* that arrived at the ball character 73 will catch the ball.

Here, the selected character, e.g., a fielder character or the like, will move in response to the speed at which the touch pen is moved. For example, if the movement speed of the touch pen when moved on the monitor is fast, the selected character will move relatively quickly, and if the movement speed of the touch pen when moved on the monitor is slow, the selected character will move relatively slowly.

Each Process Flow During Execution of the Defense System

Figure 7:
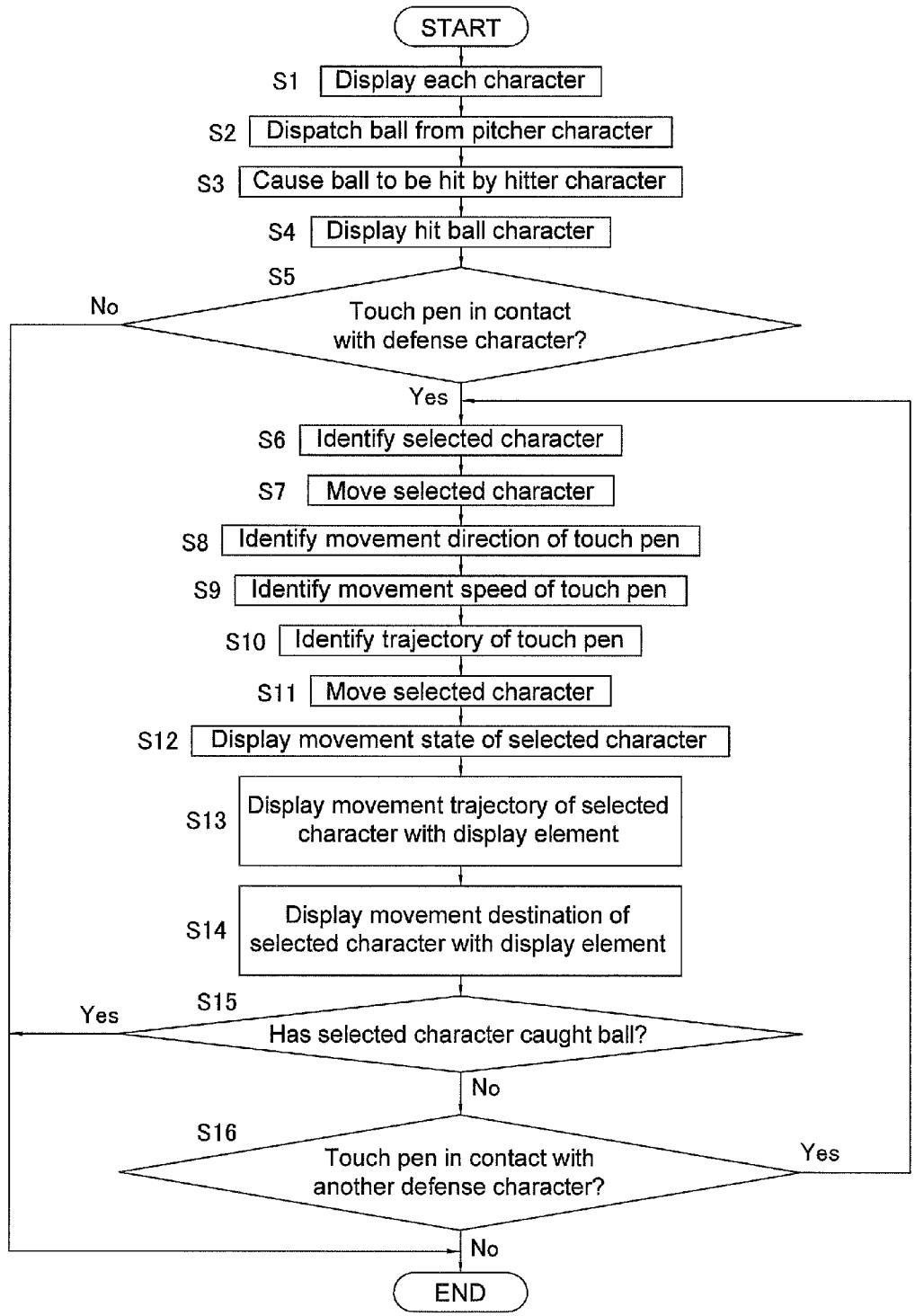
FIG. 7 is a flowchart for explaining the defense system in a baseball game.

The flowchart shown in FIG. 7 will be used to explain the defense system in the baseball game of the present embodiment.

If a player is to operate defense characters, first, the defense characters 70 and the batter character 71 will be displayed on the lower touch panel type of monitor (S1). Then, the ball character 73 will be dispatched from the pitcher character (S2), and the ball character 73 will be hit by the batter character 71 (S3). Then, the movement state of the ball character 73 that was hit will be displayed on the monitor (S4).

Next, it will be determined whether or not the touch pen was placed into contact with any one of the defense characters 70 (S5). If it is determined that the touch pen was placed into contact with any one of the defense characters 70 (S5 is yes), that one character of the defense characters 70 will be selected as a selected character (S6). If the touch pen is placed into contact with the selected character and is moved toward the predicted movement destination of the ball character 73 (S7), the movement direction of the touch pen will be identified (S8). Then, the movement speed of the touch pen moved on the monitor will be identified (S9). Then, the trajectory of the touch pen moved on the monitor will be identified (S10).

When this occurs, the selected character will be moved in the movement direction of the touch pen along the trajectory in response to the movement speed of the touch pen (S11). The movement state of the selected character at this point will be displayed on the monitor (S12). In addition, the movement trajectory of the selected character will be displayed on the monitory with, for example, a broken like and arrow display element (S13), and the movement destination of the selected character will be displayed on the monitor with, for example a circle mark display element (S14).

Finally, it will be determined whether or not the selected character has caught the ball (S15). If it is determined that the selected character has not caught the ball (S15 is no), then it will be determined whether or not the touch pen has been placed into contact with a character different than the selected character (S16). If it is determined that the touch pen has been placed into contact with a character different than the selected character (S16 is yes), that different character will be identified as the next selected character (S6), and the processes of S7 to S15 will be executed again. Note that if it is determined that the touch pen has been consecutively placed into contact with characters different than the selected character (if S16 is consecutively yes), then when there are no more defense characters 70 that can be selected as a selected character 70, it will be determined that the touch pen is not in contact with a character different that the selected character (S16 is no), and this series of catching processes will be completed. In addition, if it is determined that the selected character has caught the ball (S15 is yes), then the series of catching processes will also be completed.

Other Embodiments (a) With the aforementioned embodiment, an example was illustrated in which the portable game unit 1 was used as an example of a computer that can utilize the game program, however the game device is not limited to the aforementioned embodiment, and can also utilize in the same way a game device formed separately from a monitor, a game device for commercial use that is formed integrally with a monitor, and a personal computer, a workstation, or the like that functions as a game device by executing a game program.

(b) The present invention also includes a program and method for executing the game described above, and a computer readable storage medium on which the program is stored. Other than the cartridge, examples of recording media include computer readable flexible disks, semiconductor memory, CD-ROM, DVD, MO, ROM cassettes, and the like.

INDUSTRIAL APPLICABILITY

With the present invention, a character will be selected when the command means is placed into contact with the character. Then, the movement direction when the command means is moved on the monitor will be identified, and the selected character will be moved in the movement direction of the command means. The movement state display function will display the movement state of the character on the monitor. In this way, the player can cause the character to move in the direction of movement of the command means by simply moving the command means on the monitor. In other words, a player can easily execute a command to move a character.

What is claimed is:

1. A non-transitory computer readable medium storing a game program for causing a computer to implement a game in which a movable character and a moving object moving on a different location with the movable character are displayed on a touch panel type of monitor, the game program comprising:
    code for selecting the movable character by allowing a control device to recognize a coordinate of the movable character which indicates the position of the movable character when an input means is placed into contact with the movable character;
    code for allowing the control device to sequentially recognize a coordinate of the input means and identifying a movement direction of the input means on the basis of the coordinate of the input means when the input means is moved on the monitor;
    code for identifying a trajectory of the input means when the input means is moved on the monitor on the basis of the coordinate of the input means;
    code for controlling the movable character after being selected to trace the trajectory of the input means by allowing the control device to output a signal for moving the movable character; and
    code for displaying the movement state of the movable character which moves in the movement direction of the moving object along the trajectory on the monitor.

2. The computer readable medium according to claim 1, the code for displaying the movement state including code for displaying at least one of the movement direction of the character and a movement destination of the character on the monitor as a display element on the basis of the coordinate of the input means.

3. The computer readable medium according to claim 1, the game program further comprising
    code for allowing the control device to calculate the movement speed of the input means on the basis of the coordinate of the input means and moving time of the input means when the input means is moved on the monitor,
    the code for moving the movable character selected in the movement direction including code for moving the movable character by selecting the movable character in the movement direction of the input means in response to the movement speed when the control device outputs the signal for moving the movable character, and
    the code for displaying the movement state of the movable character including code for displaying the movement state of the movable character which is moved in the movement direction of the moving object along the trajectory in response to the movement speed on the monitor.

4. The game program according to claim 3,
    the code for displaying the movement state of the movable character including code for displaying the trajectory of the movable character by allowing the control device to recognize image data in a memory device.

5. The game program according to claim 1, further comprising
    code for selecting a plurality of characters by allowing the control device to recognize coordinates which indicate the positions of the plurality of characters when the input means is placed into contact with the plurality of characters on the monitor.

6. A method for implementing a game in which a moveable character and a moving object moving on a different location with the movable character are displayed on a touch panel type of monitor, the method comprising:
    a selection step for selecting by a central processing unit the movable character by allowing a control device to recognize a coordinate of the movable character which indicates the position of the movable character when input means is placed into contact with the movable character on the monitor;

a movement direction identification step for allowing by the central processing unit the control device to sequentially recognize a coordinate of the input means and identifying trajectory of the input means when the input means is moved on the monitor, a movement execution step for controlling by the central processing unit the movable character after being selected to trace the trajectory of the input means by allowing the control device to output a signal for moving the movable character; and a movement state display step for displaying by the central processing unit the movement state of the movable character which moves in the movement direction of the moving object along the trajectory on the monitor.

* * * * *